Oct. 5, 1937.  B. S. SAMPLE ET AL  2,094,823

MOLD

Filed June 27, 1935

INVENTORS
Basil S. Sample and William A. Fletcher
BY
Spencer Hardman & Fehr
their ATTORNEYS Patented Oct. 5, 1937

2,094,823

UNITED STATES PATENT OFFICE 2,094,823

MOLD

Basil S. Sample and William A. Fletcher, Anderson, Ind., assignors to General Motors Corporation, Detroit, Mich., a corporation of Delaware Application June 27, 1935, Serial No. 28,680

4 Claims. (Cl. 18—34)

This invention relates to a method and apparatus for suspending an insert in a mold cavity.

In cases where expediency or necessity requires that an article with inserts be formed in a mold cavity in which an insert is suspended, various methods of suspension have been heretofore resorted to, all of which are more or less unsatisfactory. One of the most widely practiced methods of suspension relies on frictional retention of the suspended insert in a mold cavity and is accomplished by merely fitting a portion of the insert tightly into a corresponding opening in a cavity wall. This method requires the exertion of a considerable human force upon a usually small insert in the more or less restricted space between open companion molds, and more often than not is the frictionally engaging, often-times plated surface of the insert marred. Another known method of suspension creates an artificial bond between the insert and the receiving opening in a cavity wall, for instance by applying some resinous varnish to the holding portion of the insert prior to its deposition in the receiving opening, whereupon the varnish coat forms a bond between the insert and the engaging wall of the opening after deposition of the insert in the comparatively hot mold. This latter method is not only costly for several reasons but also too slow to permit expedient molding since the insert has to be held in the receiving opening for some time before the varnish coat forms a sufficiently strong bond to hold the insert in place.

It is an object of the present invention to suspend an insert in a mold cavity by a partial vacuum, thereby to overcome the difficulties of the heretofore practiced methods of suspension.

It is another object of the present invention to clear the insert receiving opening in a cavity wall of possible flash by a blast of compressed air.

Further objects and advantages of the present invention will be apparent from the following description, reference being had to the accompanying drawing wherein a preferred embodiment of the present invention is clearly shown.

Figure 1:
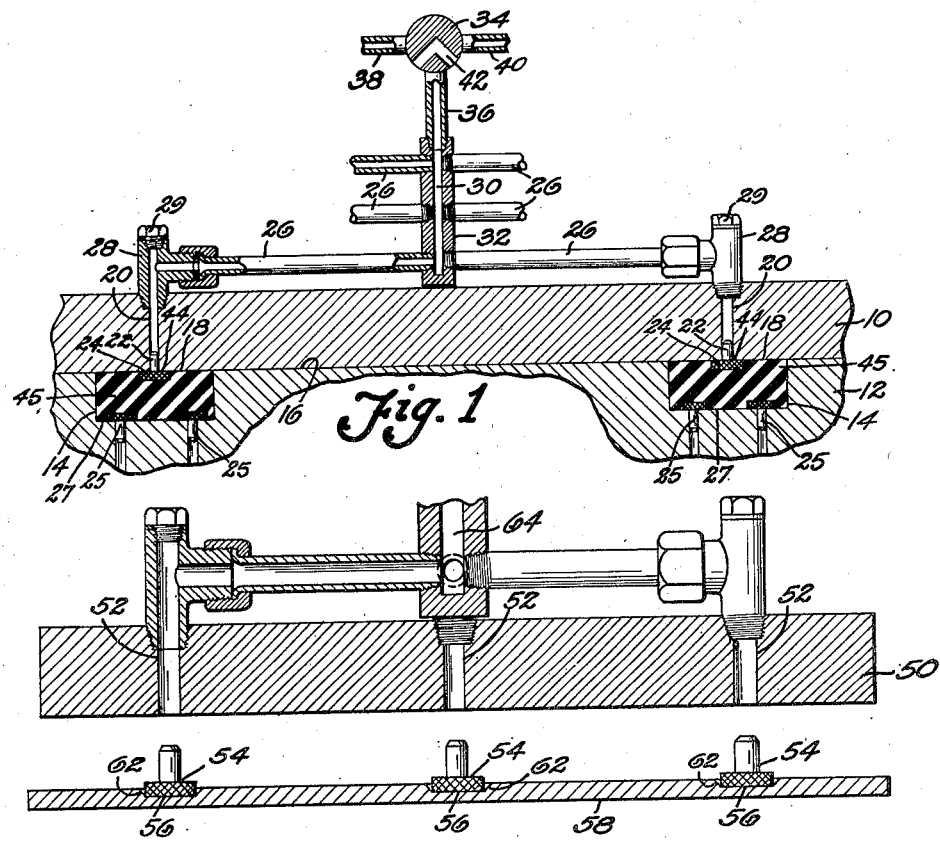
Fig. 1 is a diagrammatic illustration of an apparatus for employing a partial vacuum to suspend an insert in each cavity of a closed mold.

Referring to Fig. 1, the reference numerals 10 and 12 designate cooperating molds, either one of which may be reciprocable relative to the other. In the present instance mold 10 is preferably stationary whereas mold 12 is movable relative thereto for opening or closing the molds. Reference numeral 14 designates a number of cavities in mold 12 which may be of any suitable shape to define the shape of an article formed in the molds. For simplicity's sake no cavities are shown in mold 10, the flat surface 16 of said mold merely forming flat walls 18 of the cavities 14 in mold 12, but for all intents and purposes mold 10 may comprise cavities of any suitable shape to complete those of mold 12 in defining the shape of an article formed in these molds. Mold 10 is provided with a plurality of comparatively small openings 20 which terminate at the cavity wall forming portions 18 of mold 10 and are of the same cross-sectional size and shape as the shanks 22 of inserts 24 which are to be suspended in the mold cavities. To explain one of various reasons why inserts have to be frequently suspended in a mold cavity, inserts 25 are shown supported on the cavity walls 27. Each one of the openings 20 is in communication with a conduit 26 by means of an elbow or other suitable connector 28. The conduits 26 are in turn communicating with a division chamber 30 which is formed by any suitable casing or housing 32. Chamber 30 communicates with any conventional three-way valve 34 through a conduit 36. Communicating with this three-way valve 34 through a conduit 38 is any suitable vacuum producing means such as a vacuum pump (not shown). Also communicating with valve 34 through a conduit 40 is a supply of compressed air which is suitably replenished, for instance by a compressor (not shown). Valve 34 is manually selectively shiftable into any one of three positions of which the inoperative position is shown in Fig. 1. This valve may be shifted from inoperative position either to provide communication between conduits 40 and 36 or between conduits 38 and 36, through intermediation of a duct 42 in said valve 34. Mold 12 may be moved away from the closed position in Fig. 1 and into closed position again in any suitable manner whatever. While the molds 10, 12 are separated, the operator of the mold shifts valve 34 into the position into which duct 42 thereof provides communication between conduits 38 and 36. The operator then inserts the shanks 22 of the inserts 24 into the mold openings 20 wherein they are held by a partial vacuum as can be readily understood. It is not essential and in fact not advisable to have an air tight fit between the insert shanks 22 and the mold openings 20, so that the partial vacuum may exert some drawing force on the shoulders 44 of the inserts adjacent the shanks thereby insuring that these shoulders 44 are always in engagement with the cavity walls 18 of mold 10. It can also be understood that as long as the shank receiving openings 20 of mold 10 as well as the area of communication between the vacuum pump and these openings 20 are comparatively small, the inserts 24 may be successively introduced into their respective mold openings since there is a sufficient vacuum created in each opening 20 to hold the first insert in place even though the remaining openings 20 are as yet in free communication with the atmosphere. Success of this procedure is further enhanced by crowding the vacuum producing means, the valve 34 and the cavities of a mold into the smallest possible space and by locating the distributing chamber 30 substantially centrally of the cavities. The only restriction upon the number of insert receiving openings 20 which are connected to the distributing chamber 30 is placed by the drawing force of the partial vacuum in each opening 20 which has to hold an insert in place even when the remaining openings 20 have not yet received their insert.

After all inserts have been thus placed in the mold, moldable material, for instance bakelite, is placed into the cavities 14, and mold 12 is thereafter moved into closed position thereby compressing the charge in the cavities into the articles 45. The molds 10, 12 are properly heated so that the molded articles may become vulcanized. Upon separation of the molds, the operator shifts valve 34 into the position in which the compressed air conduit 40 communicates with conduit 36 through valve duct 42, resulting in discharge of a blast of compressed air through each one of the mold-openings 20 to remove such flash of molded material which may have penetrated into the slight clearance between the insert shanks 22 and the mold openings 20. The cavities 14 of the movable mold are so designed that the molded articles remain therein during separation of the molds and are thereafter removed from the cavities in any suitable manner. In case the operator should accidentally omit the insertion of one or more inserts into the molds, it is obvious that the empty openings 20 will then be clogged up with molded material. To remove such material, the connectors 28 are provided with detachable plugs 29, permitting access to the openings 20 with a suitable tool to punch out the material which clogs up these openings.

Figure 2:
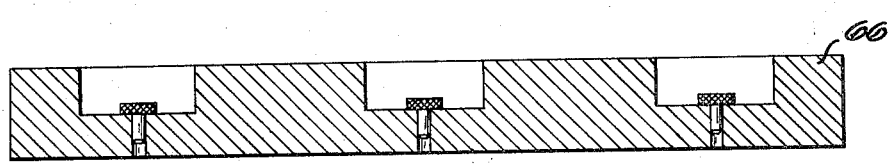
Fig. 2 is a modification of the apparatus shown in Fig. 1 and includes an insert holding plate, permitting the simultaneous introduction of a plurality of inserts into their respective openings in certain cavity walls.
Figure 3:
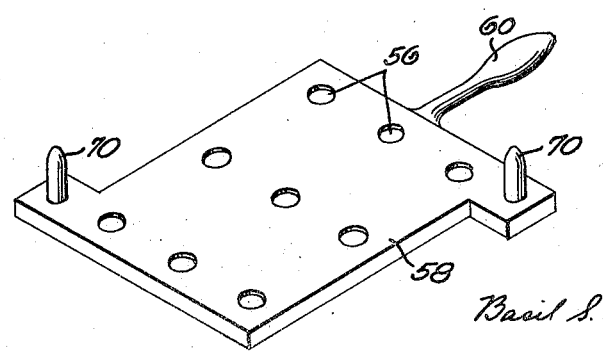
Fig. 3 is a diagrammatic view of an insert holding plate which may be used with the apparatus of Fig. 2.

Wherever an exclusive conduit connects one insert receiving opening with a vacuum pump, the cross-sectional area of such opening is limited only by the weight of the insert which is to be held in said opening by the drawing force of the partial vacuum therein. However, where one vacuum pump is connected to several insert receiving openings of approximately the size of those in Fig. 2, successive deposition of the inserts is impossible since too much air enters those openings which are as yet without an insert and thus weaken the partial vacuum in all openings to such an extent that no insert will be held in place. Nevertheless, in order successfully to use one vacuum pump in conjunction with a plurality of insert receiving openings 52 of considerable cross-section, all the inserts 54 are simultaneously introduced into their respective openings 52, in which case a sufficient partial vacuum is simultaneously created in all of these openings after a comparatively short period of holding these inserts in their openings. In order simultaneously to introduce and thereafter hold the inserts 54 for a short period in the openings 52, these inserts are placed in suitable recesses 56 of a plate 58 which is provided with a suitable handle portion 60 for manipulating said plate. The insert receiving recesses 56 of plate 58 have tapered side walls 62 to reduce the frictional engagement of the inserts with the recesses 56 to a minimum so that upon removal of the plate axially of the inserts 54 and after their vacuum retention in the openings 52, the recesses 56 have no tendency to remove these inserts from their openings. The recesses 56 of plate 58 of course locate the inserts 54 in the same relation to each other as they will assume upon deposition in their respective openings 52. In Fig. 2 only the distributing chamber 64 is shown, but it is to be understood that the mold of Fig. 2 includes the same three-way valve, the same vacuum producing means and air compressor and the same communications as the mold of Fig. 1. The movable mold 66 is shown separated from the stationary mold 50 in order to illustrate the manner in which the inserts 54 are supported on the plate 58 before they are deposited in their respective openings 52. It is likewise to be understood that although Fig. 2 shows only three mold cavities, any other number of cavities may be provided by the molds 50, 66. The three-way valve which is omitted in Fig. 2 but which may be provided in the same manner as shown in Fig. 1, may naturally be shifted to provide communication between a compressed air supply and the mold openings 52 to blow out such particles of molded material which happen to penetrate to these openings during a preceding molding operation.

In order properly to guide plate 58 such that the insert shanks properly enter their respective openings 52, plate 58 is preferably provided with a plurality of locating pins 70 which are adapted to register with suitable holes (not shown) in mold 50 prior to the entry of the insert shanks into the openings 52.

Whereas throughout the description reference was had to a mold for producing articles of moldable material such as bakelite, it is to be understood that metal could be cast into these molds without prejudice to the explained vacuum suspension of inserts. In that case it is of course imperative that the casting metal has a lower melting temperature than the insert and the mold material.

While the embodiment of the present invention as herein disclosed, constitutes a preferred form, it is to be understood that other forms might be adopted, all coming within the scope of the claims which follow.

We claim:

1. The combination of a mold having an opening leading to a lower wall of the mold cavity and receiving the shank of an insert the head of which projects into the cavity and the shank and opening being of congruent cross-section, the head to be embedded in the molded article and the shank to depend therefrom; and a device for producing in said opening a partial vacuum which acts on the exposed shank end, thereby holding the insert suspended.

2. The combination of a mold having openings leading to a lower wall of the mold cavity and each receiving the shank of an insert the head of which projects into the cavity, the shanks and openings being of congruent cross-section and the heads to be embedded in the molded article and the shanks to depend therefrom; a vacuum producing device; conduits providing communication between the device and all openings which are of comparatively small area wherefore a sufficient partial vacuum is created in any opening immediately upon insertion of a shank therein to hold the insert suspended even though other openings have not yet received a shank.

3. The combination of a mold having an opening leading to a lower wall of the mold cavity and receiving the shank of an insert the head of which projects into the cavity and the shank and opening being of congruent cross-section, the head to be embedded in the molded article and the shank to depend therefrom; a vacuum producing device; mechanism for supplying compressed gas; and control means operable to provide or intercept communication between opening and device or mechanism, respectively, the partial vacuum in the opening acting on the exposed shank end to hold the insert suspended and the compressed gas being adapted to blow possible flash from the opening.

4. The combination of a mold having openings leading to a lower wall of the mold cavity and each receiving the shank of an insert the head of which projects into the cavity, the shanks and openings being of congruent cross-section and the heads to be embedded in the molded article and the shanks to depend therefrom; a vacuum producing device; mechanism for supplying compressed gas; and control means operable simultaneously to provide or intercept communication between all openings and the device or mechanism, respectively, the partial vacuum in the openings being adapted to act on the exposed shank ends and holding the inserts suspended and the compressed gas being adapted to blow possible flash from all openings.

BASIL S. SAMPLE.
WILLIAM A. FLETCHER.